Oct. 6, 1959 H. P. GUERBER 2,907,989

SIGNAL STATICIZER

Filed March 13, 1956

INVENTOR.
HOWARD P. GUERBER

BY Morris [signature]

ATTORNEY

United States Patent Office 2,907,989

Patented Oct. 6, 1959

2,907,989

SIGNAL STATICIZER

Howard P. Guerber, Barrington, N.J., assignor to Radio Corporation of America, a corporation of Delaware Application March 13, 1956, Serial No. 571,165

3 Claims. (Cl. 340—174)

Figure 1:
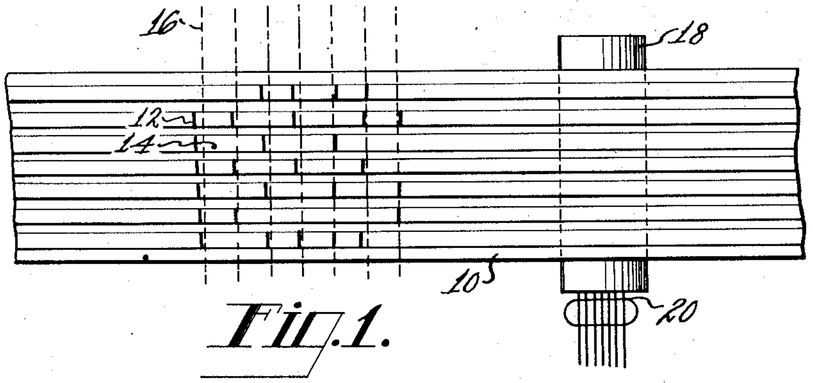

This invention relates to information handling systems and particularly to systems for sensing information encoded on a moving web or the like.

In modern data processing equipment, information in binary coded form may be supplied serially by character and parallel by bit. A typical input source may be a punched card or a moving web such as paper tape, magnetic tape, or photographic film, containing physical representations of binary coded data in several channels. Informaiton "tapes" often do not contain timing reference marks or other means to synchronize the individual "bits" of information that form a code character. Instead reliance is placed on the simultaneous passage past reading heads or other reading means to assure simultaneity of occurrence of the parallel bit marks of each character combination.

In the absence of a synchronizing source, transients or other effects may cause the component bits of a character to lose their simultaneity in random fashion. Misalignment of the web in the reading device or maladjustment of the reading or writing heads may cause a linear "skew" effect. Either variety of "skew" destroys the parallelism-in-time of the individual information bits. If messages are transferred directly from one medium to another, the skew effect often cumulates and may cause the loss of the one or more character bits which arrive too late to be read with the other bits of the character. Loss of one or more bits gives rise to an incorrect character signal.

Another problem of information handling systems may be the random variation in character spacing due to normal mechanical and electrical tolerances. In those information handling systems, where it is desirable to make logical decisions during the interval between successive characters, it is important that this interval never fall below some predetermined limit.

In the past, circuits have been devised whereby a trigger pulse is generated by the occurrence of at least one information bit. The trigger pulse is used to gate all of the bits into the system simultaneously. One such circuits is disclosed in the patent to Dallas R. Andrews, entitled Magnetic Pulse Recording, No. 2,760,063, issued August 21, 1956, and assigned to the assignee of the present invention.

In using the first-occurring bit to gate the character into the system, the location in time of the character is fixed. The skew effect may cause the first bit to arrive at a time other than the nominal character arrival time, displacing the entire character in point of time. Therefore, when skew effects are present, characters represented by few or late occurring bits may appear delayed in the system and tend to "crowd" the characters immediately following.

Accordingly, it is an object of the present invention to provide an improved means to correct for the effects of either misaligned recording heads or tape skew.

It is a further object of the invention to provide a means to gate all parallel bits of a binary code character into an information handling system simultaneously and with a maximum character spacing.

Another object of the present invention is to provide a means to correct for the effects of tape skew by delaying a character during which delay the later occurring bits of a binary code character are delayed for a shorter time.

It is a still further object of the invention to provide an improved means for gating asynchronous signals into an information handling system.

It is an additional object of the invention to provide an improved means for simultaneously presenting all of the parallel bits of a binary coded character to an information handling system.

According to the present invention, the information bits are staticized in individual flip-flops and the first of these bits is passed into a circuit including a delay. After a delay interval during which all of the bits may be staticized, a pulse is passed by the delay circuit to open signal "and" gates permitting the staticized bits to pass into the system. After further delay, the gating pulse may also reset the staticizing flip-flops. In order to maintain a maximum interval between the successive characters, the first bit pulse of one character is delayed by a predetermined amount, and, if earlier than the delayed first character pulse of the next succeeding character, serves to gate out all of the bits of the next succeeding character.

Where used in the text below, a flip-flop is to be understood as referring to a bistable multivibrator having set and reset input terminals and providing outputs indicative of the set and reset state. Such flip-flops are generally well known in the art. "And" gates are known circuit elements which have several inputs and which provide an output only when all of the inputs are energized. An "or" circuit is a known logical circuit element having a plurality of inputs and is capable of providing an output when any input is energized.

Figure 2:
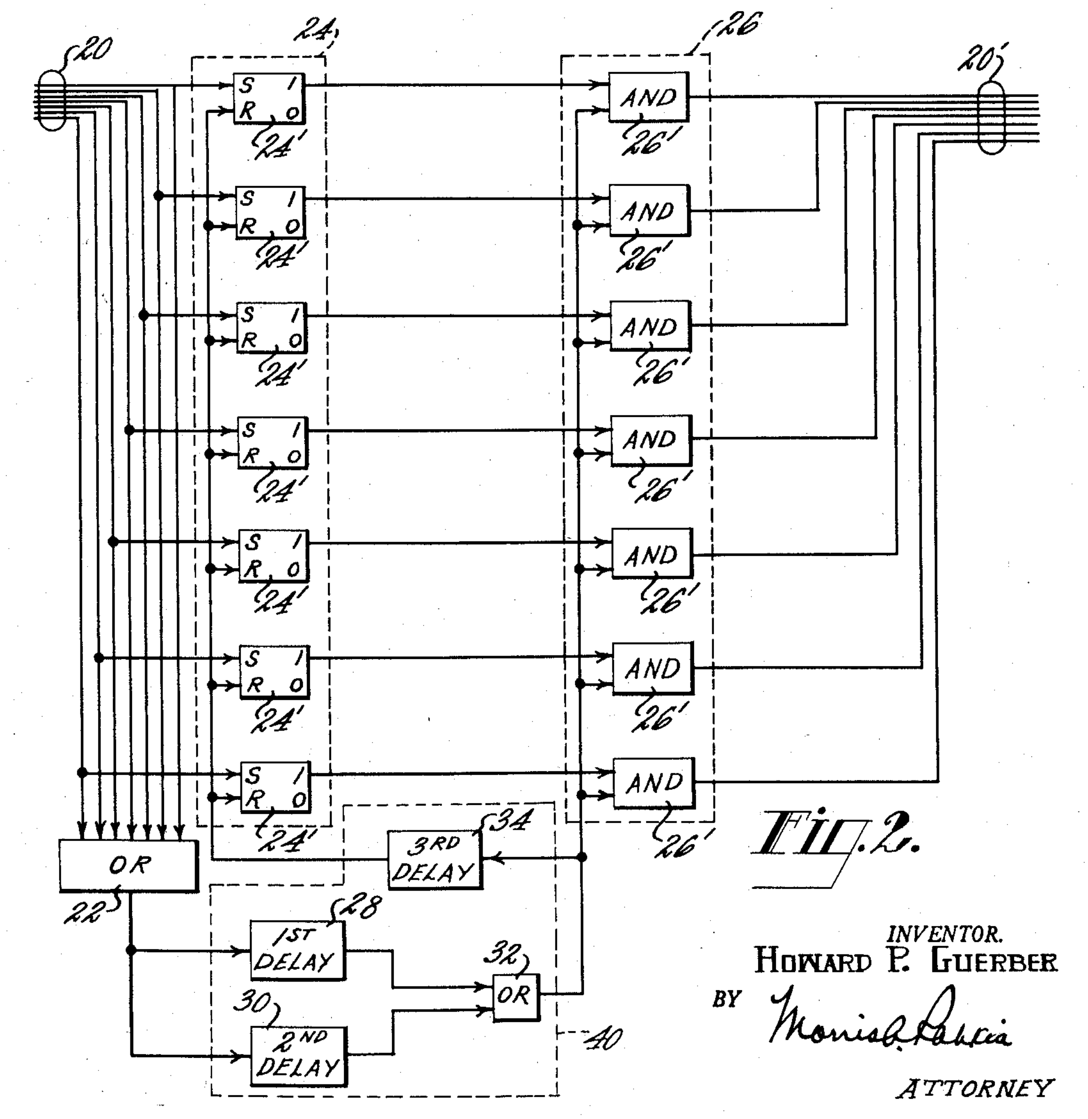

The present invention may best be understood with reference to the following description and the drawings, in which like reference numerals refer to like parts and in which:

Figure 1 is a view of an information bearing web, for example, a magnetic tape having several information channels containing magnetized spots, and Figure 2 is a diagram of a signal staticizer according to the present invention.

In the diagram of Figure 1, an information tape 10 contains coded information bits 12 disposed on the surface thereof. These may be magnetized spots on the magnetic tape, punched holes in paper tape, or exposed areas on photographic film. In the circuit of Figure 1, a portion of a magnetic tape 10 is shown having seven information carrying channels 14 in which spots of magnetization are placed in parallel columns 16. Each information character may consist of a particular binary combination of magnetized spots in one of the column 16.

As a result of tape skew or misalignment of reading heads 18, the information bits of spots 12 may appear out of parallel alignment with the reading heads in that some information spots 12 appear in advance of the column line 16 and others lag the columns line 16. The columns 16 are to be considered as perpendicular to the recording channels 14. The same effects may be observed if parallel reading heads 18 are not aligned parallel with the recording heads (not shown) relative to the direction of tape travel. Under these conditions, bits 12 detected in adjacent channels 14 by the reading heads 18 would appear successively rather than simultaneously in time.

It will be understood that the columns 16 need not be as shown. For example, any geometrical configuration may be employed so long as the reading and writing means are similarly oriented. Random circuit effects or non identical orientation of reading and writing means may result in randomly skewed characters. The main requirement in recording systems of this type is that the several bits representing a character be read simultaneously.

The signals from each of the reading heads 18 are supplied to a detecting system over a multi-channel cable 20 which connects to the circuit of Figure 2. Each of the individual signals representing information "bits" are transmitted along the line of the multi-channel cable 20 corresponding to the channel 14 in which the bit is recorded. The signals are applied to an "or" circuit 22, and to a register 24 of staticizer flip-flops containing individual staticizer flip-flops 24' each receiving a different channel 14 signal at its set terminal S. The set side or "one" outputs of staticizer flip-flops 24' are applied to the inputs of a set of signal "and" gates 26 made up of individual two-input "and" gates 26', each corresponding to a different staticizer flip-flop 24'.

The "or" circuit 22 is a seven-input "or" circuit which provides an output on the occurrence of a bit signal in any channel 14. The output of the "or" circuit 22 is applied in parallel lines to a first delay 28 and to a second delay 30. The outputs of both delays are applied to a two-input "or" circuit 32 whose output is applied to a third delay 34 and to the enabling inputs of each of the "and" gates 26'. The outputs of the "and" gates 26' are joined in the multi-channel cable 20' for use within the information handling system. The output of the third delay 34 is applied to the reset terminals R of each of the staticizer flip-flops 24' to reset them after the stored information character has been gated into the system.

The combination of the first and second delays 28, 30, and the "or" circuit 32 with the third delay 34 may be considered as a second signal source 40 (enclosed by the dashed rectangle) whose input is connected to the "or" circuit 22. The second signal source 40 applies one signal to enable the set of "and" gates 26 and a later signal to reset the set of flip-flops 24.

In operation, the multiple bits 12 of an incoming character detected at the reading heads 18 are transmitted on the lines of the information cable 20. In the embodiment shown, the first occurring of these information signals that is a binary "one" is a pulse which sets that staticizer flip-flop 24' corresponding to the information channel 14 carrying this first "one." This first "one" pulse also passes through the "or" circuit 22 and enters the first and second delays 28, 30.

By way of example, one embodiment of an information handling system may utilize a magnetic tape which travels at 80 inches per second. Characters, in the form of discrete magnetized areas, are packed 125 to the inch. In operation, the average character rate of this system is 10,000 characters per second or 10 kilocycles. The individual characters detected in the system are separated in time, on the average, by a 100 microsecond nominal interval between the leading edges of the first bits of successive characters. In such a 10 kilocycle system, the first delay 28 may be 50 microseconds and the second delay may be fixed at an amount equal to the first delay, here 50 microseconds, plus the nominal character spacing which in this example is 100 microseconds.

Persons skilled in the art may select suitable delay values in accordance with the principles discussed herein, corresponding to the duration of the individual bit pulses and the nominal width of a pulse envelope encompassing all bits 12 of a single character. Similarly, values may be selected for other embodiments utilizing different average character rates.

As the first character of a message is being detected, the first "one" signal is delayed by 50 microseconds and passes through the "or" circuit 32. The 50 microsecond interval allows all of the bits present in that first column 16 (Fig. 1) to be staticized in the proper staticizer flip-flops 24'. The first "one" signal is applied to all of the "and" gates 26', after the 50 microsecond delay, simultaneously gating the contents of the set staticizer flip-flops 24' into the system. The first "one" signal is further delayed in the third delay 34 by approximately 2 microseconds during which the information flows through the "and" gates 26'. The output of the third delay 34 is applied to the reset terminals R of all of the staticizer flip-flops 24', resetting them to receive the next character, and also imparting to all output pulses a substantially uniform two microsecond duration.

As the second character appears at the reading heads 18, the first "one" of this second character is passed through the "or" circuit 22 into the first and second delays 28, 30. The incoming bits are staticized in the staticizer flip-flops 24'. If the characters are spaced at 100 microseconds, the first "one" signal of the first character will arrive at the "or" circuit 32 simultaneously with the first "one" signal of the second character. Should the second character arrive slightly earlier or later than the proper 100 microsecond spacing, the first occurring of the two first "one" signals applied through the "or" circuit 32 gates the second character into the system through the "and" gates 26' and resets the staticizer flip-flops 24'.

The number of information channels may be varied and the delays may be adjusted to suit the problems of individual circuits. The system of the present invention allows for a moderate amount of discrepancy in the frequency with which individual character signals appear, and also corrects for errors in the simultaneity of the bit signals. Signals arriving slightly earlier than the normal character rate may be gated into the system after a minimum delay. Individual signals arriving at intervals greater than the nominal character rate or appearing to be late are given slightly less time to be staticized, being gated into the system at a fixed time after the preceding character.

What is claimed is:

1. In combination, a set of resettable registers each having a set and a reset state, a first signal source selectively setting certain ones of said registers, a set of signal gates each responsive to a corresponding one of said set registers, a second signal source connected to said first signal source and comprising a first and second delaying means, an "or" circuit means connected to receive the outputs of said first and second delaying means to apply an enabling signal simultaneously to all of said signal gates at a time after the first of said registers is activated, and a further delaying means connected to said registers and responsive to said enabling signal to apply a resetting signal simultaneously to reset all of said registers at a time after said signal gates are enabled, said enabling signal being derived from the earlier occurring of (1) the first delaying means output representing a current signal, and (2) the second delaying means output representing a signal immediately preceding said current signal.

2. In a system for transmitting information represented by successive sets of nominally simultaneous character signals in parallel channels, the combination comprising: a plurality of resettable registers, each of said registers having a set input, a reset input, and a set output corresponding to said set input, each said set input being responsive to the signal transmission of a different one of said channels; a plurality of signal gating means, each of said gating means being conditioned by the set output of a different one of said registers; gate enabling means connected to receive said character signals and to apply an enabling signal simultaneously to said signal gating means, said enabling means including first and second signal delaying means each responsive to the first occuring character signal of each of said sets, said second delaying means providing a time delay substantially equal to that provided by said first delaying means plus the time interval corresponding to the nominal spacing between successive sets of said character signals, said enabling signal being derived from the first delayed signal occurring after one of said registers has been set by said first occurring character signal; and a third delaying means connected to receive said enabling signal and to apply said enabling pulse simultaneously to each said reset input after a further delay.

3. In a system for transmitting information represented by successive sets of nominally simultaneous signals in selected ones of parallel channels, the combination comprising: a set of storage means each having a first input connected to a different one of said parallel channels; a plurality of gates each conditioned by the output of a different one of said storage means; first and second signal delaying means connected in parallel and each responsive to the first occurring signal of each of said successive sets, said second delaying means providing a delay greater than that of said first delaying means by an amount corresponding to the nominal spacing between said successive sets; an "or" circuit connected to receive the outputs of said first and second delaying means; and means applying the output of said "or" circuit to each of said gates to enable conditioned gates.

References Cited in the file of this patent

UNITED STATES PATENTS

| | | |
|---|---|---|
| 2,575,342 | Gridley | Nov. 20, 1951 |
| 2,597,866 | Gridley | May 27, 1952 |
| 2,700,155 | Clayden | Jan. 18, 1955 |
| 2,793,344 | Reynolds | May 21, 1957 |